United States Patent
Yang et al.

(10) Patent No.: US 12,212,010 B2
(45) Date of Patent: *Jan. 28, 2025

(54) FASTENER-FREE CASING AND BATTERY MODULE

(71) Applicant: Dongguan Amperex Technology Limited, Dongguan (CN)

(72) Inventors: Pengcheng Yang, Dongguan (CN); Jinbing Zhou, Dongguan (CN); Mingjie Wu, Dongguan (CN); Xin Wang, Dongguan (CN)

(73) Assignee: DONGGUAN AMPEREX TECHNOLOGY LIMITED, Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/524,317

(22) Filed: Nov. 30, 2023

(65) Prior Publication Data
US 2024/0097254 A1    Mar. 21, 2024

Related U.S. Application Data

(63) Continuation of application No. 16/652,669, filed as application No. PCT/CN2020/081530 on Mar. 27, 2020, now Pat. No. 11,870,085.

(30) Foreign Application Priority Data

Sep. 4, 2019    (CN) .......................... 201910833241.7

(51) Int. Cl.
*H01M 50/00*    (2021.01)
*H01M 50/202*   (2021.01)
(Continued)

(52) U.S. Cl.
CPC ....... *H01M 50/202* (2021.01); *H01M 50/262* (2021.01); *H01M 50/271* (2021.01)

(58) Field of Classification Search
CPC ............. H01M 50/202; H01M 50/262; H01M 50/271; H01M 50/20; Y02E 60/10
See application file for complete search history.

(56) References Cited

U.S. PATENT DOCUMENTS

2011/0236738 A1*  9/2011  Yang ................... H01M 50/209
                                            429/97
2012/0067914 A1   3/2012  Sadler et al.
(Continued)

FOREIGN PATENT DOCUMENTS

CN    202678427 U     1/2013
CN    204067449 U    12/2014
(Continued)

OTHER PUBLICATIONS

Office Action issued Jul. 1, 2021, in corresponding Australian Application No. 2020202328, 5 pages.
(Continued)

*Primary Examiner* — Anca Eoff
*Assistant Examiner* — Monique M Wills
(74) *Attorney, Agent, or Firm* — Maier & Maier, PLLC

(57) ABSTRACT

A battery module includes a battery module, which includes a battery unit and a casing for receiving the battery unit. The casing includes a first casing body, a second casing body assembled to the first casing body, and a first sealing ring disposed between the first casing body and the second casing body. The first casing body includes a first cover plate and first sidewalls connected to edges of the first cover plate. A slot is defined on outer surface of the first sidewalls. The second casing body includes a second cover plate and second sidewalls connected to edges of the second cover
(Continued)

plate. A latch is disposed at inner surface of the second sidewalls, corresponding to the slot. The latch is configured to be received in the slot, locating and sealing the second cover plate on the first cover plate by compressing the first sealing ring.

20 Claims, 9 Drawing Sheets

(51) Int. Cl.
    *H01M 50/262* (2021.01)
    *H01M 50/271* (2021.01)

(56) References Cited

U.S. PATENT DOCUMENTS

| | | |
|---|---|---|
| 2014/0272546 A1 | 9/2014 | Badie et al. |
| 2015/0221905 A1 | 8/2015 | Guo et al. |

FOREIGN PATENT DOCUMENTS

| | | | |
|---|---|---|---|
| CN | 104470290 | A | 3/2015 |
| CN | 104902717 | A | 9/2015 |
| CN | 205376612 | U | 7/2016 |
| CN | 205846029 | A | 12/2016 |
| CN | 206742333 | U | 12/2017 |
| CN | 107654650 | A | 2/2018 |
| CN | 207425935 | U | 5/2018 |
| CN | 207558895 | U | 6/2018 |
| CN | 105845863 | B | 10/2018 |
| EP | 2683139 | A1 | 1/2014 |
| JP | 2008166060 | A | 7/2008 |
| JP | 2013143395 | A | 7/2013 |
| JP | 20143019 | A | 1/2014 |
| KR | 20190070006 | A | 6/2019 |

OTHER PUBLICATIONS

Notice of Allowance issued Feb. 2, 2022, in corresponding Australian Application No. 2020202328, 4 pages.
Extended Search Report issued Feb. 5, 2021, in corresponding European Application No. 20712818.2-1108 PCT/CN2020081530, 7 pages.
Notice of Allowance issued Jan. 29, 2022, in corresponding Chinese Application No. 201910833241.7, 6 pages.
Office Action issued Jun. 28, 2021, in corresponding Chinese Application No. 201910833241.7, 15 pages.
Search Report issued Jun. 3, 2020, in corresponding International Application No. PCT/CN2020/081530, 6 pages.
Notice of Allowance issued Jun. 6, 2022, in corresponding Japanese Application No. 2020-518730, 5 pages.
Office Action issued Dec. 7, 2021, in corresponding Japanese Application No. 2020-518730, 4 pages.

\* cited by examiner

FASTENER-FREE CASING AND BATTERY MODULE

CROSS REFERENCE TO RELATED APPLICATIONS

The present application is a continuation application of U.S. patent application Ser. No. 16/652,669, entitled "Fastener-free casing and battery module," filed on Mar. 31, 2020, which is a continuation application of PCT international application PCT/CN2020/081530, filed on Mar. 27, 2020, the disclosure of which is hereby incorporated by reference in its entirety.

FIELD

The disclosure relates to batteries, and more particularly, to a battery module.

BACKGROUND

Nowadays, battery modules are packaged in packing shells. A front cover of the packing shell includes a waterproof strip made of rubber. The front cover and the back cover of the packing shells are assembled together by screwing at front or side, thereby sealing the packing shell. However, the sealing process is not an efficient one in production, and the screws affect the appearance of the packing shell when fitted.

SUMMARY

What is needed, is a battery module that can improve the sealing process without adversely affecting the appearance of the packing shell.

The present disclosure provides a battery module including a battery unit and a casing for receiving the battery unit. The casing includes a first casing body, a second casing body assembled to the first casing body, and a first sealing ring is disposed between the first casing body and the second casing body. Wherein the first casing body includes a first cover plate and a plurality of first sidewalls connected to edges of the first cover plate, a slot is defined on outer surface of the plurality of first sidewalls, the slot is inclined relative to a plane along which the first cover plate extends. Wherein the second casing body includes a second cover plate and a plurality of second sidewalls connected to edges of the second cover plate, a latch is disposed at inner surface of the plurality of second sidewalls. Wherein the latch is configured to be received in the slot, thereby locating the second cover plate on the first cover plate and compressing the first sealing ring.

In some embodiments, the slot includes a first slot portion and a second slot portion connected to the first slot portion. The first slot portion is inclined relative to a plane along which the first cover plate extends, and the second slot portion is parallel to the plane along which the first cover plate extends. The latch is configured to slide into the second slot portion through the first slot portion.

In some embodiments, the slot includes a first slot portion and a second slot portion connected to the first slot portion. The first slot portion and the second slot portion are both inclined to the plane along which the first cover plate extends. Inclination directions of the first slot portion and the second slot portion are opposite to each other. The latch is configured to slide into the second slot portion through the first slot portion.

In some embodiments, the casing further includes a third casing body. The first casing body includes a first opening opposite to the first cover plate and a second opening opposite to the first sidewall. The second opening is connected to the first opening. The second casing body is configured to cover the first opening. The third casing body is configured to cover the second opening and connect the first casing body to the second casing body.

In some embodiments, the third casing body includes a third cover plate and a plurality of third sidewalls connected to edges of the third cover plate. The third cover plate corresponds to the second opening. The plurality of third sidewalls surrounds the first casing body and the second casing body.

In some embodiments, a slot plate is connected to the outer surface of the plurality of first sidewalls. The slot plate includes a main body and two connecting portion connected to two sides of the main body. The connecting portion is fixed to the outer surface of the first sidewall, the main body is spaced apart from the first sidewall. The main body includes a side edge spaced apart from the first cover plate, and the slot is defined from the side edge towards the main body.

In some embodiments, a length of the latch is less than a distance between the main body and the first sidewall connected to the corresponding slot plate.

In some embodiments, a first fixing hole is defined in the connecting portion, and a second fixing hole corresponding to the first fixing hole is defined in the first sidewall; a bolt passes through the first fixing hole and the second fixing hole to connect the connecting portion to the first sidewall.

In some embodiments, the bolt is covered by the second casing body.

In some embodiments, the slot defines a third opening on a side edge. A width of the third opening is greater than a width of the latch.

In some embodiments, the slot further includes an end portion opposite to the third opening, and the first sealing ring has a compression degree greater than or equal to 50% when the latch is disposed at the end portion.

In some embodiments, a flange extends from an edge of the plurality of first sidewalls facing away from the first cover plate. and the first sealing ring is disposed between the second cover plate and the flange.

In some embodiments, a width of the flange extending from the plurality of first sidewalls is less than a distance between the main body and the plurality of first sidewalls.

In some embodiments, the first casing body further includes an extending portion, which extends from an edge of the plurality of first sidewalls and is disposed in the second opening, and the third cover plate and the extending portion are connected together by fastening members.

In some embodiments, a second sealing ring is disposed between the third cover plate and the plurality of second sidewalls, and the second sealing ring is compressed when the third cover plate covers the second opening.

In some embodiments, the second cover plate defines a groove, and a portion of the first sealing ring is received in the groove.

In some embodiments, a length of the latch is greater than a depth of the slot.

In some embodiments, a plurality of slots are defined on an outer surface of a first wall from the plurality of first sidewalls; a plurality of latches are disposed at an inner surface of a second wall from the plurality of second sidewalls, the first wall and the second wall face each other.

In some embodiments, the first sealing ring is fixed to the second cover plate by adhesive.

In some embodiments, a diameter of the latch is less than a width of the slot.

The first casing body and the second casing body of the present disclosure are assembled together by means of the slot and the latch. The installation process is convenient and fast. Since fastening members such as screws are omitted, production efficiency is improved, and screws do not adversely affect the appearance of the casing.

Description of symbols for main elements: 1 represents a casing, 2 represents a battery unit, 10 represents a first casing body, 11 represents a first cover plate, 12 represents a first sidewall, 13 represents a slot plate, 14 represents a first opening, 15 represents a second opening, 16 represents an extending portion, 20 represents a second casing body, 21 represents a second cover plate, 22 represents a second sidewall, 30 represents a third cover plate, 32 represents a third sidewall, 33 represents a second sealing ring, 40 represents a first sealing ring, 120 represents a slot, 121 represents a third opening, 122 represents an end portion, 123 represents a flange, 131 represents a main body, 132 represents a connecting portion, 160 represents a third fixing hole, 210 represents a groove, 220 represents a latch, 1201 represents a first slot portion 1202 represents a second slot portion, 1310 represents a side edge, and 1320 represents a first fixing hole.

Implementations of the disclosure will now be described, with reference to the drawings.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are not to be considered as limiting the scope of the embodiments.

Implementations of the disclosure will now be described, by way of embodiments only, with reference to the drawings. It should be noted that non-conflicting details and features in the embodiments of the present disclosure may be combined with each other.

Figure 1:
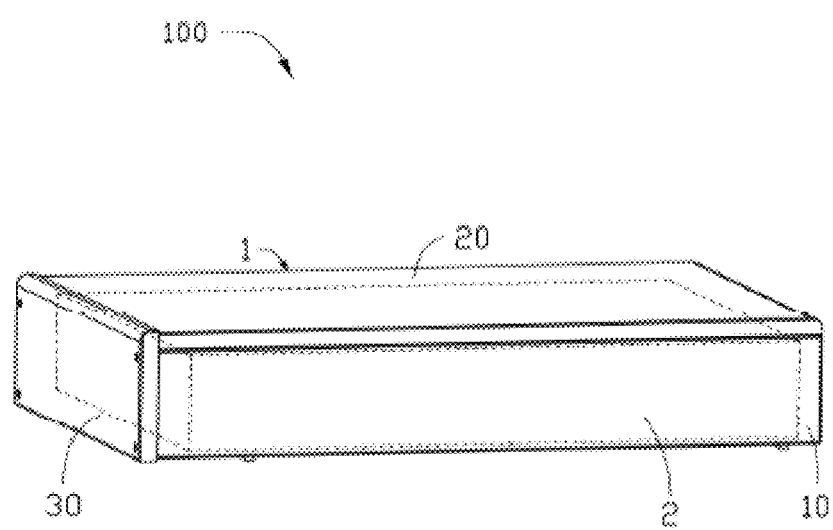
FIG. 1 is a perspective view of an embodiment of a battery module according to the present disclosure.
Figure 2:
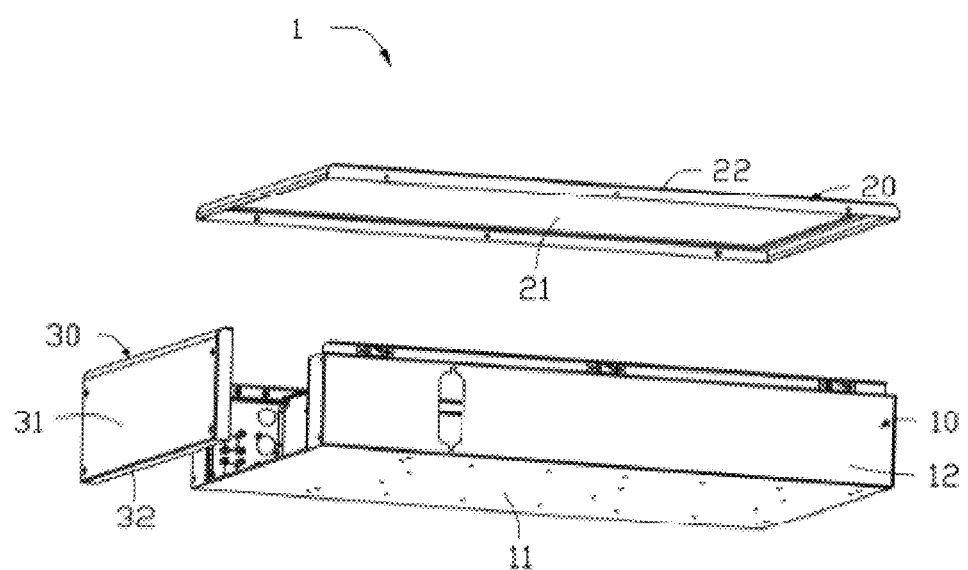
FIG. 2 is an exploded view of the battery module of FIG. 1.
Figure 3:
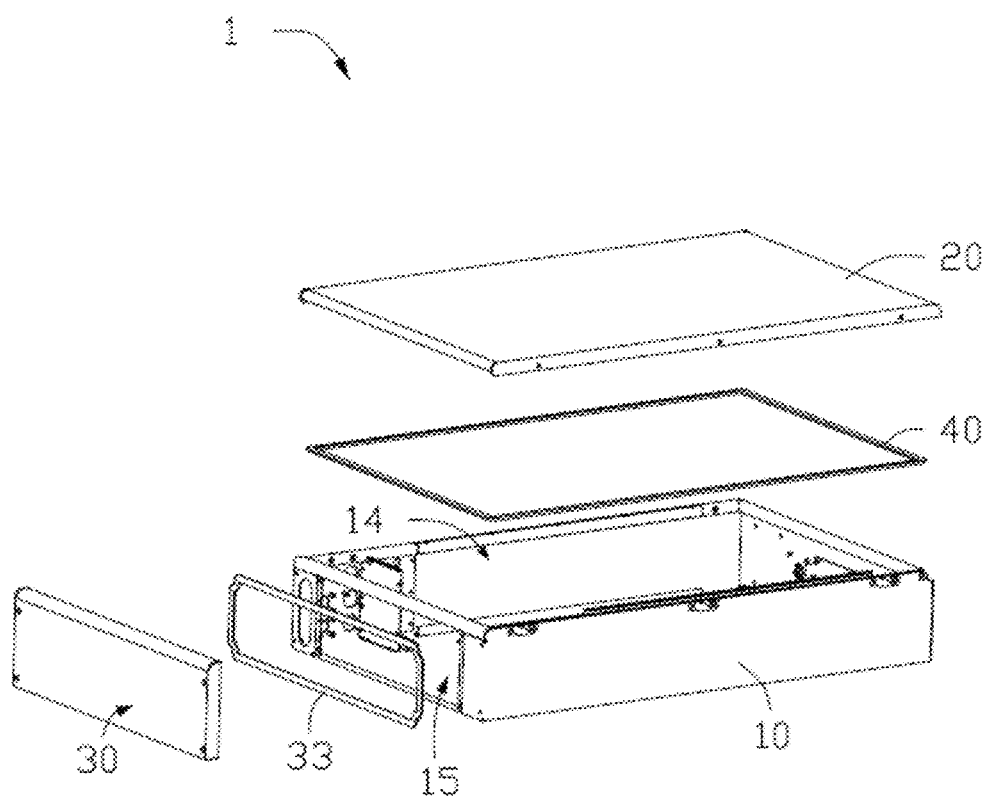
FIG. 3 is an exploded view of the battery module of FIG. 1, from another angle.
Figure 4:
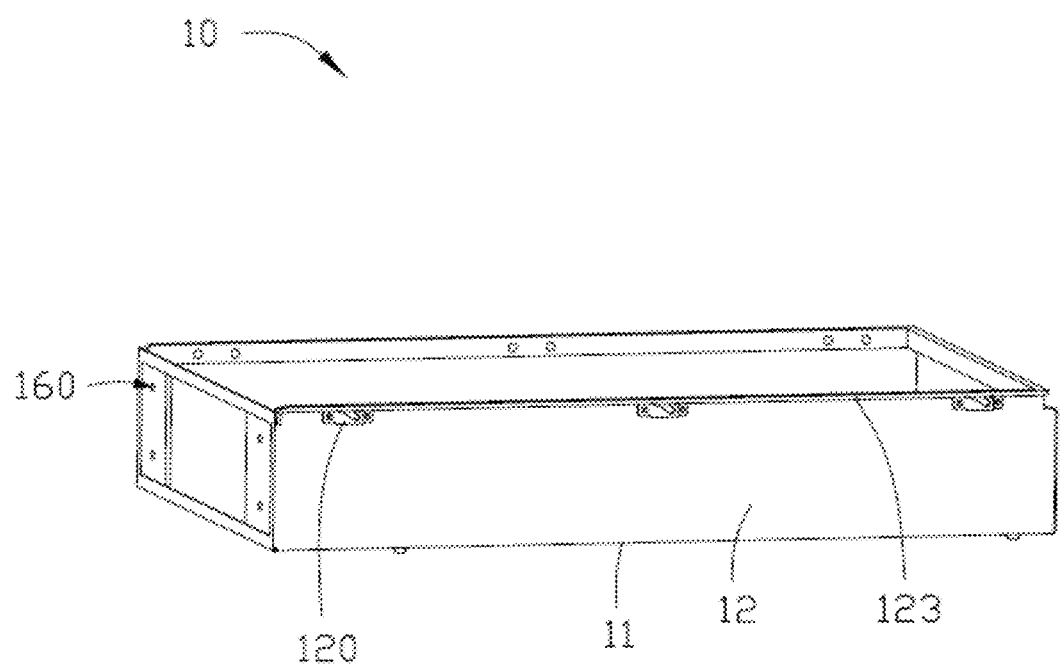
FIG. 4 is a perspective view of a first casing body of the battery module of FIG. 1.
Figure 5A:
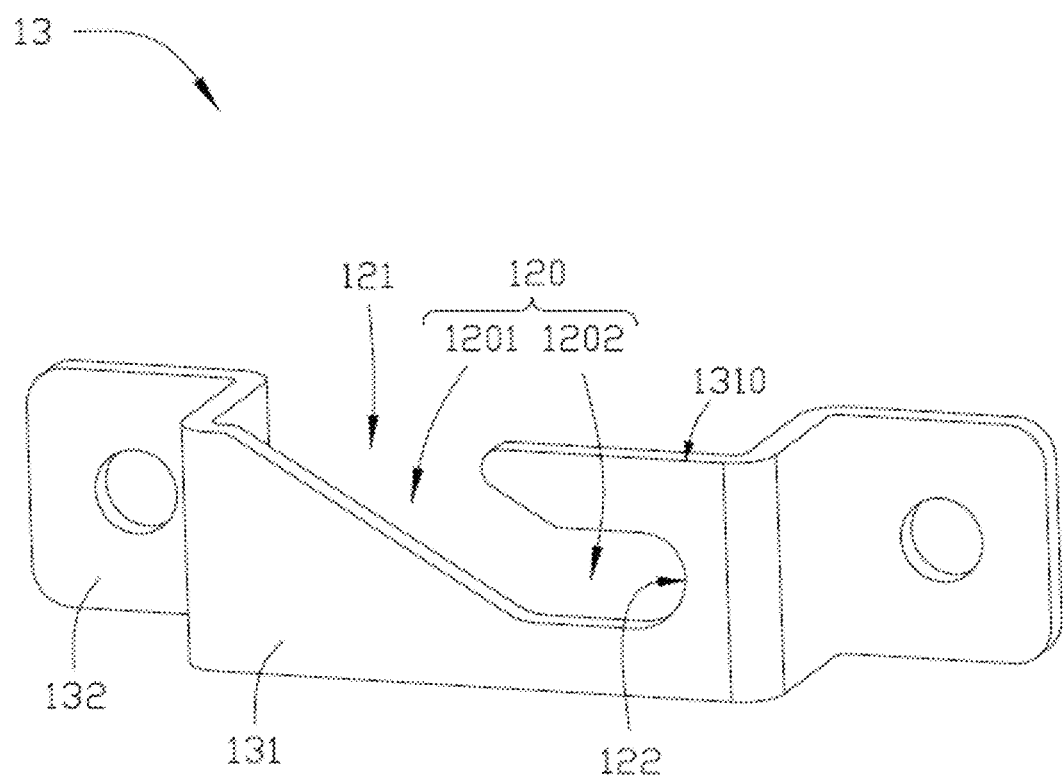
FIG. 5A is a perspective view of a slot plate of the first casing body of FIG. 4, in an embodiment.
Figure 6:
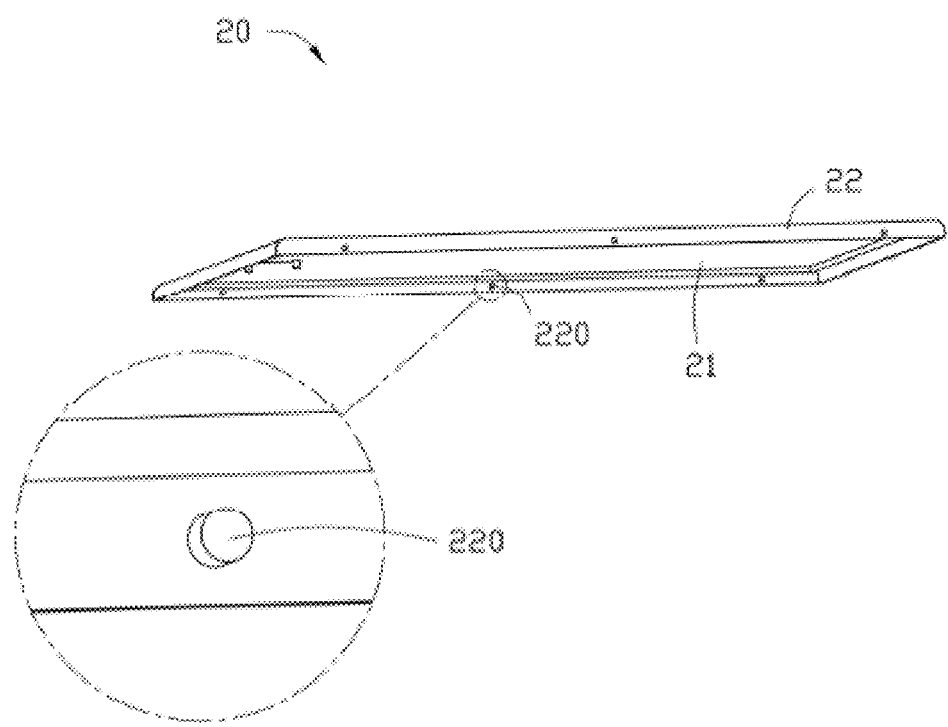
FIG. 6 is a perspective view of a second casing body of the battery module of FIG. 1.

FIGS. 1 to 3 illustrates an embodiment of a battery module 100 according to the present disclosure, which includes a battery unit 2 and a casing 1 for receiving the battery unit 2. The casing 1 includes a first casing body 10, a second casing body 20 assembled to the first casing body 10, and a first sealing ring 40 disposed between the first casing body 10 and the second casing body 20. Referring to FIG. 4 and FIG. 5A, the first casing body 10 includes a first cover plate 11 and a plurality of first sidewalls 12 connected to edges of the first cover plate 11. At least one slot 120 is defined on outer surface of the first sidewalls 12. The number of the slot(s) 120 may be multiple (the figure shows six slots 120), and the slots 120 are disposed at two of the first sidewalls 12 facing each other. Referring to FIG. 6, the second casing body 20 includes a second cover plate 21 and a plurality of second sidewalls 22 connected to edges of the second cover plate 21. At least one latch 220 is disposed at inner surface of the second sidewalls 22. The at least one latch 220 corresponds to the at least one latch slot 120. The latch 220 is configured to be received in the slot 120, locating the second cover plate 21 on the first cover plate 11 and compressing the first sealing ring 40.

Furthermore, the latch 220 may be a pin. The first sealing ring 40 may be made of at least one of silicone, fluorine rubber, polyurethane foam, nitrile rubber, and natural rubber materials. The second cover plate 21 defines a groove 210. A portion of the first sealing ring 40 is received in the groove 210, thereby locating the first sealing ring 40 on the second casing body 20 and preventing the first sealing ring 40 from detaching from the second casing body 20. In another embodiment, the groove 210 may be omitted, and the first sealing ring 40 may be fixed to the second cover plate 21 by adhesive.

The first casing body 10 and the second casing body 20 of the present disclosure are assembled together by means of the slot 120 and the latch 220. The installation process is convenient and fast. Since fastening members such as screws are omitted, production efficiency is improved, and screws do not adversely affect the appearance of the casing 1.

Figure 5B:
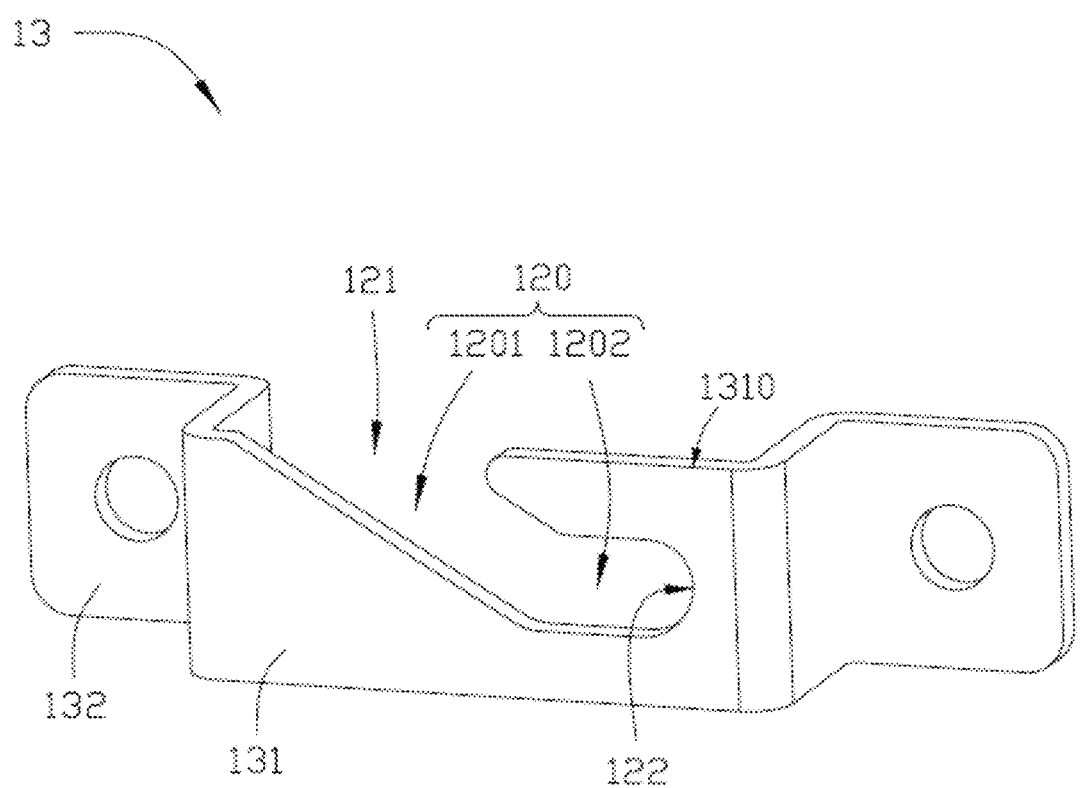
FIG. 5B is a perspective view of a slot plate of the first casing body of FIG. 4, in another embodiment.
Figure 5C:
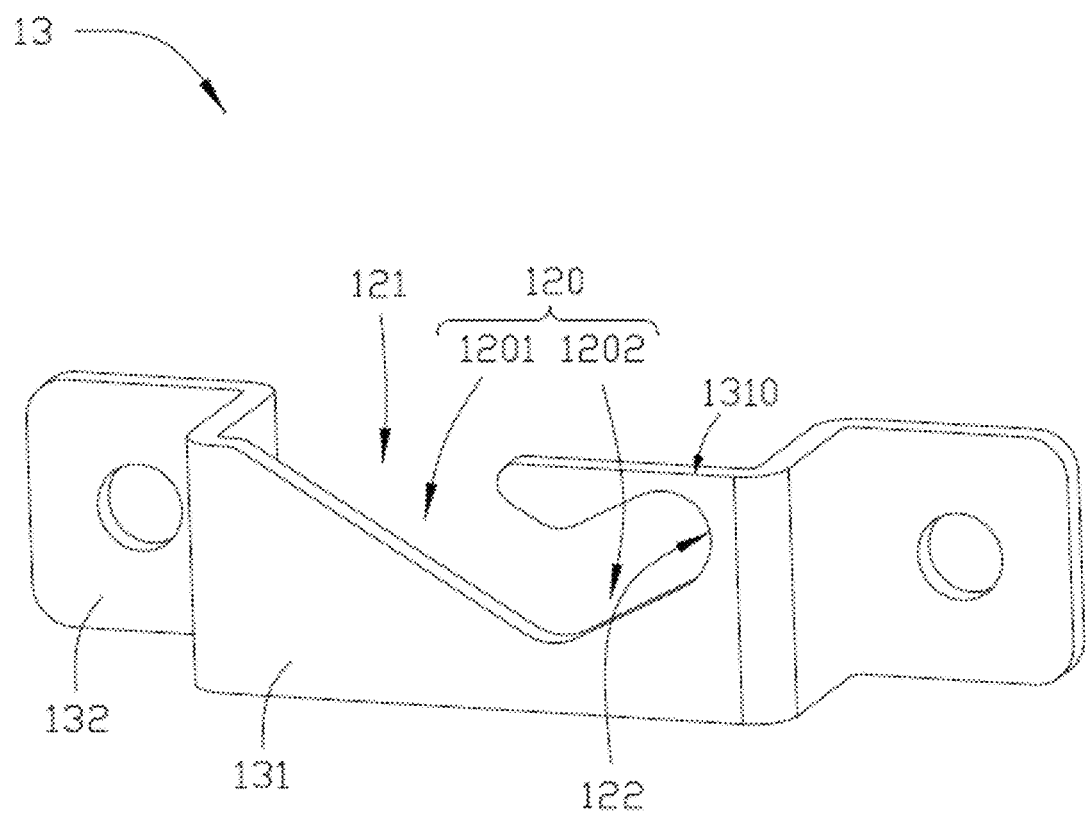
FIG. 5C is a perspective view of a slot plate of the first casing body of FIG. 4, in yet another embodiment.

Referring to FIG. 4 and FIG. 5A, in an embodiment, the slot 120 is inclined relative to a plane along which the first cover plate 11 extends. The inclination angle may be 0 degree to 90 degrees. Since the slot 120 is inclined, the second casing body 20 is prevented from detaching from the first casing body 10. Referring to FIG. 5B, in another embodiment, the slot 120 includes a first slot portion 1201 and a second slot portion 1202 connected to the first slot portion 1201. The first slot portion 1201 is inclined relative to the plane along which the first cover plate 11 extends, and the second slot portion 1202 is parallel to the plane along which the first cover plate 11 extends. The latch 220 is configured to slide into the second slot portion 1202 through the first slot portion 1201. Since the latch 220 may be received in the second slot portion 1202, the latch 220 is thus prevented from sliding out of the slot 120, thereby holding the second casing body 20 and the first casing body together. Referring to FIG. 5C, in yet another embodiment, the slot 120 includes a first slot portion 1201 and a second slot portion 1202 connected to the first slot portion 1201. The first slot portion 1201 and the second slot portion 1202 are both inclined to the plane along which the first cover plate 11 extends, and the inclination directions of the first slot portion 1201 and the second slot portion 1202 are opposite to each other. For example, the slot 120 may be shaped like the letter "V". The latch 220 is configured to slide into the second slot portion 1202 through the first slot portion 1201. Since the latch 220 may be received in the second slot portion 1202, the latch 220 is also prevented from sliding out of the slot 120, thereby keeping the first and second casing bodies 10 and 20 together.

Referring to FIG. 5A, in some embodiments, at least one slot plate 13 is connected to the outer surface of the first sidewalls 12. The slot plate 13 includes a main body 131 and two connecting portion 132 connected to two sides of the main body 131. The connecting portion 132 is fixed to the outer surface of the first sidewall 12. The main body 131 is spaced apart from the first sidewall 12. The main body 131 includes a side edge 1310 spaced apart from the first cover plate 11. The slot 120 is defined from the side edge 1310 towards the main body 131.

A length of the latch 220 may be greater than a depth of the slot 120 (i.e., a thickness of the main body 131), and may be less than a distance between the main body 131 and the first sidewall 12 connected to the corresponding slot plate 13.

Furthermore, a diameter of the latch 220 may be in a range between 0.05 mm to 1 mm. The diameter of the latch 220 is slightly less than a width of the slot 120, thereby allowing easy installation of the latch 220 in the slot 120.

The connecting portion 132 may be connected to the first sidewall 12 by bolting, riveting, or soldering. In the embodiment, the connecting portion 132 is connected to the first sidewall 12 by bolts. Referring to FIG. 5A, a first fixing hole 1320 is defined in the connecting portion 132, and a second fixing hole (not shown) corresponding to the first fixing hole 1320 is defined in the first sidewall 12. A bolt may pass through the first fixing hole 1320 and the second fixing hole to connect the connecting portion 132 to the first sidewall 12. Since the bolt is covered by the second casing body 20 after the first casing body 10 and the second casing body 20 are assembled, the bolt is prevented from affecting the appearance of the casing 1.

In some embodiments, the slot 120 defines a third opening 121 on the side edge 1310. A width of the third opening 121 is greater than a width of the latch 220. The slot 120 further includes an end portion 122 opposite to the third opening 121. When the latch 220 is disposed at the end portion 122, the first sealing ring 40 has a compression degree greater than or equal to 50%. Then, the first sealing ring 40 can perform excellent sealing effect between the first casing body 10 and the second casing body 20, thereby preventing foreign matter, such as external moisture and dust, from entering the casing 1.

Referring to FIG. 4, in some embodiments, a flange 123 extends from an edge of the first sidewall 12 facing away from the first cover plate 11. A width of the flange 123 extending from the first sidewall 12 is less than a distance between the main body 131 and the first sidewall 12. The first sealing ring 40 is disposed between the second cover plate 21 and the flange 123.

Referring to FIG. 3, in some embodiments, the casing 1 further includes a third casing body 30. The first casing body 10 includes a first opening 14 opposite to the first cover plate 11 and a second opening 15 opposite to the first sidewall 12. The second opening 15 is connected to the first opening 14. The second casing body 20 is configured to cover the first opening 14. The third casing body 30 is configured to cover the second opening 15, and connect the first casing body 10 to the second casing body 20, thereby improving the structural stability and vibration-damping performance of the casing 1.

Figure 7:
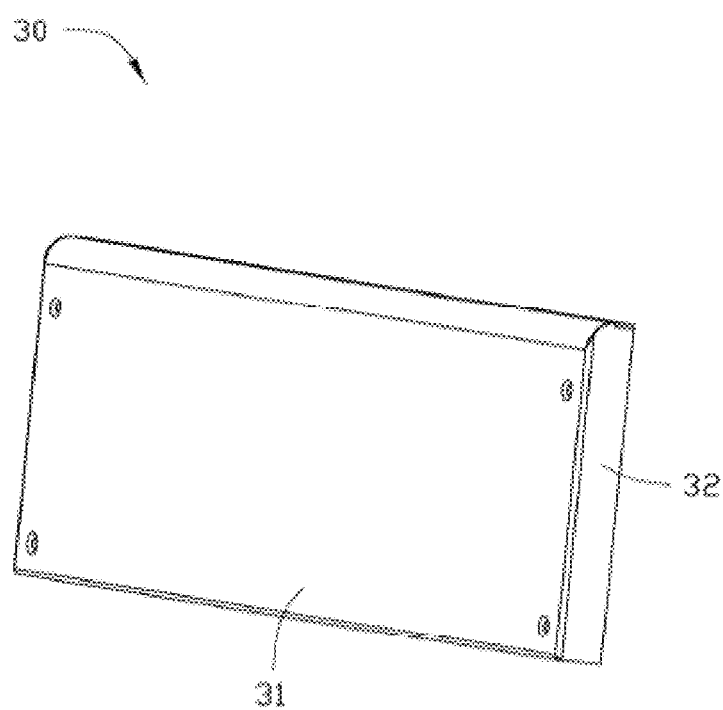
FIG. 7 is a perspective view of a third casing body of the battery module of FIG. 1.

Referring to FIG. 7, in some embodiments, the third casing body 30 includes a third cover plate 31 and a plurality of third sidewalls 32 connected to edges of the third cover plate 31. The third cover plate 31 corresponds to the second opening 15. The third sidewalls 32 surround the first casing body 10 and the second casing body 20.

In some embodiments, the first casing body 10 further includes an extending portion 16, which extends from an edge of the first sidewall 12 and is disposed in the second opening 15. The third cover plate 31 and the extending portion 16 are connected together by fastening members (such as screws, bolts, etc.). The extending portion 16 defines a third fixing hole 160, and the first cover plate 11 defines a fourth fixing hole (not shown) corresponding to the third fixing hole 160. The fastening member is inserted into the fourth fixing hole and the third fixing hole 160 to connect the third cover plate 31 to the extending portion 16. Thereby, the third casing body 30 and the first casing body 10 can be assembled together.

In some embodiments, a second sealing ring 33 (see FIG. 3) is disposed between the third cover plate 31 and the second sidewall 22. When the third cover plate 31 covers the second opening 15, the second sealing ring 33 is compressed. The second sealing ring 33 performs excellent sealing effect between the third casing body 30 and the first casing body 10.

During assembly, the second casing body 20 is disposed on the first casing body 10 to align the latch 220 with the third opening 121. Then, the second casing body 20 is pressed, causing the latch 220 to be slide in the slot 120 and compressing the first sealing ring 40. When the latch 220 slides to the end portion 122 of the slot 120, the first sealing ring 40 has a great compression degree, which performs excellent sealing effect. Then, the third casing body 30 is connected to the first casing body 10, thereby compressing the second sealing ring 33. Thus, excellent sealing effect is obtained between the third casing body 30 and the first casing body 10.

The embodiments shown and described above are only examples. Even though numerous characteristics and advantages of the present technology have been set forth in the foregoing description, together with details of the structure and function of the present disclosure, the disclosure is illustrative only, and changes may be made in the detail. It will, therefore, be appreciated that the embodiments described above may be modified within the scope of the claims.

What is claimed is:

1. A battery module comprising:
  a battery unit; and
  a casing for receiving the battery unit, the casing comprising a first casing body, a second casing body assembled to the first casing body, and a first sealing ring disposed between the first casing body and the second casing body;
  wherein the first casing body comprises a first cover plate and a plurality of first sidewalls connected to edges of the first cover plate, a slot is defined on outer surface of the plurality of first sidewalls, the slot is inclined relative to a plane along which the first cover plate extends;
  wherein the second casing body comprises a second cover plate and a plurality of second sidewalls connected to edges of the second cover plate, a latch is disposed at inner surface of the plurality of second sidewalls;

wherein the latch is configured to be received in the slot, thereby locating the second cover plate on the first cover plate and compressing the first sealing ring.

2. The battery module of claim 1, wherein the slot comprises a first slot portion and a second slot portion connected to the first slot portion, the first slot portion is inclined relative to a plane along which the first cover plate extends, and the second slot portion is parallel to the plane along which the first cover plate extends, the latch is configured to slide into the second slot portion through the first slot portion.

3. The battery module of claim 1, wherein the slot comprises a first slot portion and a second slot portion connected to the first slot portion, the first slot portion and the second slot portion are both inclined to the plane along which the first cover plate extends, inclination directions of the first slot portion and the second slot portion are opposite to each other, the latch is configured to slide into the second slot portion through the first slot portion.

4. The battery module of claim 1, wherein the casing further comprises a third casing body, the first casing body comprises a first opening opposite to the first cover plate and a second opening opposite to the first sidewall, the second opening is connected to the first opening, the second casing body is configured to cover the first opening, and the third casing body is configured to cover the second opening and connect the first casing body to the second casing body.

5. The battery module of claim 4, wherein the third casing body comprises a third cover plate and a plurality of third sidewalls connected to edges of the third cover plate, the third cover plate corresponds to the second opening, and the plurality of third sidewalls surrounds the first casing body and the second casing body.

6. The battery module of claim 1, wherein a slot plate is connected to the outer surface of the plurality of first sidewalls, the slot plate comprises a main body and two connecting portion connected to two sides of the main body, the connecting portion is fixed to the outer surface of the first sidewall, the main body is spaced apart from the first sidewall, the main body comprises a side edge spaced apart from the first cover plate, and the slot is defined from the side edge towards the main body.

7. The battery module of claim 6, wherein a length of the latch is less than a distance between the main body and the first sidewall connected to the corresponding slot plate.

8. The battery module of claim 6, wherein a first fixing hole is defined in the connecting portion, and a second fixing hole corresponding to the first fixing hole is defined in the first sidewall;

a bolt passes through the first fixing hole and the second fixing hole to connect the connecting portion to the first sidewall.

9. The battery module of claim 8, wherein the bolt is covered by the second casing body.

10. The battery module of claim 6, wherein the slot defines a third opening on a side edge, a width of the third opening is greater than a width of the latch.

11. The battery module of claim 6, wherein the slot further comprises an end portion opposite to the third opening, and the first sealing ring has a compression degree greater than or equal to 50% when the latch is disposed at the end portion.

12. The battery module of claim 6, wherein a flange extends from an edge of the plurality of first sidewalls facing away from the first cover plate, the first sealing ring is disposed between the second cover plate and the flange.

13. The battery module of claim 12, wherein a width of the flange extending from the plurality of first sidewalls is less than a distance between the main body and the plurality of first sidewalls.

14. The battery module of claim 5, wherein the first casing body further comprises an extending portion, which extends from an edge of the plurality of first sidewalls and is disposed in the second opening, and the third cover plate and the extending portion are connected together by fastening members.

15. The battery module of claim 5, wherein a second sealing ring is disposed between the third cover plate and the plurality of second sidewalls, and the second sealing ring is compressed when the third cover plate covers the second opening.

16. The battery module of claim 1, wherein the second cover plate defines a groove, and a portion of the first sealing ring is received in the groove.

17. The battery module of claim 1, wherein a length of the latch is greater than a depth of the slot.

18. The battery module of claim 1, wherein a plurality of slots are defined on an outer surface of a first wall from the plurality of first sidewalls;
   a plurality of latches are disposed at an inner surface of a second wall from the plurality of second sidewalls, wherein the first wall and the second wall face each other.

19. The battery module of claim 1, wherein the first sealing ring is fixed to the second cover plate by adhesive.

20. The battery module of claim 1, wherein a diameter of the latch is less than a width of the slot.

* * * * *